(12) United States Patent
Solis, Jr. et al.

(10) Patent No.: US 10,486,004 B1
(45) Date of Patent: Nov. 26, 2019

(54) SHOULDER-MOUNTABLE QUICK-RELEASE FIRE HOSE CLAMP

(71) Applicants: Danny Solis, Jr., Valencia, CA (US); Daniel R. Solis, Valencia, CA (US)

(72) Inventors: Danny Solis, Jr., Valencia, CA (US); Daniel R. Solis, Valencia, CA (US)

(*) Notice: Subject to any disclaimer, the term of this patent is extended or adjusted under 35 U.S.C. 154(b) by 34 days.

(21) Appl. No.: 15/859,581

(22) Filed: Dec. 31, 2017

Related U.S. Application Data

(60) Provisional application No. 62/525,278, filed on Jun. 27, 2017.

(51) Int. Cl.
*A62C 33/04* (2006.01)
*F16L 3/10* (2006.01)

(52) U.S. Cl.
CPC ............ *A62C 33/04* (2013.01); *F16L 3/1075* (2013.01)

(58) Field of Classification Search
CPC ............................... A62C 33/04; F16L 3/1075
USPC ........................................ 224/194, 168, 600
See application file for complete search history.

(56) References Cited

U.S. PATENT DOCUMENTS

| | | | | |
|---|---|---|---|---|
| 1,027,527 A * | 5/1912 | Davis | ...................... | A45F 5/02 224/182 |
| 1,164,928 A * | 12/1915 | Corcoran | ............. | H02G 11/003 224/222 |
| 1,275,068 A * | 8/1918 | Messiter | .................. | E04C 5/10 248/78 |
| 1,618,831 A * | 2/1927 | Kerns | ....................... | A45F 5/02 24/3.6 |
| 2,692,712 A * | 10/1954 | Conley | ..................... | F16L 3/12 224/249 |
| 2,714,979 A * | 8/1955 | McCarthy | ................. | A45F 3/12 2/460 |
| 3,052,886 A * | 9/1962 | White | ....................... | A45F 5/02 2/268 |
| 3,369,786 A * | 2/1968 | Schloemer | ............. | B60N 2/882 248/118 |
| 3,407,383 A * | 10/1968 | Haegert | ............... | H01R 11/281 439/763 |
| 3,862,709 A * | 1/1975 | Roshaven | ................. | A45F 5/00 224/264 |
| 3,936,204 A * | 2/1976 | Jennrich | .................... | B25J 3/00 403/209 |
| 3,940,039 A * | 2/1976 | Sasaki | ...................... | A45F 5/02 224/264 |

(Continued)

*Primary Examiner* — Peter N Helvey
(74) *Attorney, Agent, or Firm* — James F. Kirk

(57) ABSTRACT

A quick-release fire hose clamp for securing a fire hose in place on a fire-fighter's shoulder includes a strap attachment assembly which is releasably fastenable to a backpack strap disposed over the fire-fighter's shoulder. The clamp includes a clamp mechanism that extends upwardly from the strap attachment assembly and has a semi-cylindrically shaped lower hose support body, and a confronting semi-cylindrically shaped upper clamp shell that is pivotable upwardly to enable a length of hose to be laid on the lower hose support body, pivotable downwardly to exert a compressive clamping force on the hose, and pivotable upwardly to release the hose. The clamp mechanism includes a pivotable clasp lever that has a cammed lower surface for exerting a compressive force on the upper surface of the upper clamp shell, the clasp lever being threadingly movable up and down to accommodate larger and smaller hoses, respectively.

17 Claims, 12 Drawing Sheets

(56) References Cited

U.S. PATENT DOCUMENTS

| | | | | |
|---|---|---|---|---|
| 4,762,257 A * | 8/1988 | Spillers | | A62B 35/0037 224/250 |
| 4,838,465 A * | 6/1989 | Metzger | | E04G 21/04 222/526 |
| 4,879,768 A * | 11/1989 | McClees | | A45F 3/12 224/264 |
| 4,887,318 A * | 12/1989 | Weinreb | | A45F 3/12 2/268 |
| 5,136,757 A * | 8/1992 | Labonville | | F16L 3/003 24/270 |
| 5,433,288 A * | 7/1995 | James | | A62C 33/04 182/3 |
| 5,441,188 A * | 8/1995 | Rosenstein | | A45F 3/12 224/264 |
| 5,758,809 A * | 6/1998 | Bonner | | A45F 3/14 224/259 |
| 6,523,227 B2 * | 2/2003 | Goodall | | A45F 5/00 2/45 |
| 7,945,969 B1 * | 5/2011 | Krause | | A41D 13/04 2/51 |
| 8,006,353 B2 * | 8/2011 | Reynolds | | A45F 5/00 224/182 |
| 8,348,317 B1 * | 1/2013 | Bird | | A45F 5/00 248/75 |
| 8,485,406 B2 * | 7/2013 | Huh | | A45F 5/021 224/241 |
| 8,708,207 B2 * | 4/2014 | Wetzsteon | | A45F 3/12 2/268 |
| 9,248,967 B1 * | 2/2016 | Gregg | | A62C 33/04 |
| 2003/0201287 A1 * | 10/2003 | Fisher | | A45F 5/02 224/268 |
| 2006/0289575 A1 * | 12/2006 | Chou | | A45F 3/14 224/264 |
| 2009/0031471 A1 * | 2/2009 | Dague | | A41D 13/1245 2/83 |
| 2013/0068807 A1 * | 3/2013 | Elam | | A45F 3/00 224/257 |

\* cited by examiner

SHOULDER-MOUNTABLE QUICK-RELEASE FIRE HOSE CLAMP

The present application claims priority of and to U.S. provisional application No. 65/525,278, filed Jun. 27, 2017.

BACKGROUND OF THE INVENTION

A. Field of the Invention

The present invention relates to tools and equipment used for extinguishing fires. More particularly, the invention relates to a shoulder-mountable quick-release hose clamp for supporting a fire hose, the clamp being fastenable to a shoulder strap of a backpack worn by a fire-fighter, and quickly attachable to and releasable from the fire hose.

B. Description of Background Art

Combating brush fires in undeveloped areas requires tactics different from those used to extinguish structure fires in cities or towns. The latter type of fires are usually relatively easily accessible by fire trucks and equipment via streets or paved roads. However, brush fires frequently occur in rugged locations in which the terrain may be hilly or mountainous, and may be located far from roads. Fires of this type are sometimes referred to generically as "wildland" fires. Extinguishing wildland fires requires fire-fighters to function in a more self-sufficient manner. Consequently, fire-fighters dispatched to combat brush fires in wild areas are typically equipped with backpacks carrying various items of equipment such as shovels, axes, and the like, which are needed to perform fire abatement tasks.

Although the methodology for fighting brush fires and other fires in undeveloped, wild areas differs in details from that used for fighting structure fires occurring in developed areas, both types of fire fighting usually rely heavily on quickly delivering large volumes of water or a fire retardant foam to extinguish a fire. Consequently, fighting fires in undeveloped or foam that is located substantially far from the fire. Thus, fighting brush fires often requires dragging a fire hose several hundred feet from a pumper truck that is located on a fire-break road, and up and/or down hilly or mountainous terrains to hot spots where fires are to be extinguished. A typical 1½-inch inner diameter fire hose that is not filled with water weighs about 32 pounds per 100-foot section. Dragging such a hose requires exerting a substantial pulling force to overcome frictional resistance forces between the hose and the surface of the ground on which the hose lies. Consequently, dragging a fire hose to the location of a wildland fire is a physically demanding task. For that reason, brush fire-fighters often work in two-man teams, including a front fire-fighter who drags a front, nozzle-end section of a fire hose to a fire location, and a rear fire-fighter, who drags a trailing section of the hose and guides the hose around and over obstructions such as trees, bushes, and rocks.

After the nozzle end of a fire hose has been positioned sufficiently close to a fire which is to be extinguished, pressurized water or foam from a pumper truck or other source is introduced into the rear inlet end of the hose. The front fire-fighter who is directing a stream of water onto a fire typically supports the front length of a pressurized fire hose on one shoulder, while grasping the hose nozzle to direct a stream of water in a sweeping motion onto a fire. When a hose is filled with water, the weight of the water-bearing hose is increased substantially. For example, the weight of a 100-foot long section of a 1½-inch inner diameter hose filled with water is increased by about 75 pounds from its empty, dry weight. Thus. dragging a fire hose which is filled with water or fire-retardant foam is an even more arduous task than dragging an empty hose.

When a fire-fighter has dragged a fire hose to a suitable location from which to direct water or foam onto a fire, a tactic known as "anchor and hold" is typically employed to combat the fire. The anchor-and-hold tactic utilizes large steams of water directed on hot spots in an attempt to stop the fire from spreading. The goals of the anchor-and-hold tactic are to extinguish structure fires, prevent the fire from spreading, and reduce ember production.

From the foregoing facts, it should be evident that conveying and manipulating a fire hose, especially when fighting brush fires in rugged hilly or mountainous terrains, is a physically demanding task. Recognition of this fact motivated the present inventors to develop a device for supporting a fire hose on a fire-fighter's shoulder.

The present invention was created by the present inventors to provide a device for supporting a fire hose on the shoulder of a fire-fighter, the device comprising a shoulder-mountable quick-release fire hose clamp that is adjustably fastenable to a shoulder strap deployed over the shoulder of a fire-fighter, quickly attachable to fire hoses of various diameters to secure the hose on the shoulder of the fire-fighter in a position which facilitates dragging the fire hose to a target location and manipulating the nozzle end of the hose to direct a stream of water onto a fire, and which enables the fire-fighter to quickly release the fire hose from the clamp to ensure the safety of the fire-fighter.

OBJECTS OF THE INVENTION

An object of the present invention is to provide a shoulder-mountable quick-release fire hose clamp which has an adjustable strap attachment assembly that is releasably fastenable to straps or belts of various widths and thicknesses, and a clamp mechanism which extends from the strap attachment assembly and is releasably fastenable to fire hoses of various diameters.

Another object of the invention is to provide a shoulder-mountable, quick-release fire hose clamp which has an adjustable strap attachment assembly that is releasably fastenable to a fire fighter's shoulder strap and a clamp mechanism which extends upwardly from the strap attachment assembly, the clamp mechanism having a lower hose support body, an upper clamp shell pivotably attached to the lower hose support body, and a clasp lever which is adjustable to control to selected values the minimum closed spacing between the lower clamp support body and the upper clamp shell when the upper clamp shell is pivoted downwardly to a closed position, the clasp lever being pivotable downwardly to thus cause a cammed lower surface of the clasp lever to exert a downward force on the upper clamp shell, thereby compressively clamping a hose of selected diameter placed on the lower hose support body.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of my exclusive rights and privileges in the invention be limited to details of the embodiments described. We do intend that equivalents, adaptations and modifications to the invention reasonably inferable from the description contained herein be included within the scope of the invention as defined by the appended claims.

SUMMARY OF THE INVENTION

Briefly stated, the present invention comprehends a shoulder-mountable quick-release fire hose clamp. A main intended purpose of the invention is to provide a device for releasably fastening to a shoulder strap or belt secured to the body of a fire-fighter, the device having a clamp mechanism that is quickly and easily fastenable to and releasable from a length of fire hose, thus enabling the fire hose to be supported on the shoulder of the fire-fighter while the hose is being dragged to a fire fighting location, and enabling a fire-fighter to manipulate a nozzle at the forward end of the fire hose with both hands to direct a stream of water or foam onto a fire.

The shoulder-mountable quick-release fire hose clamp device according to the present invention includes a strap attachment assembly for releasably attaching the device to a strap which is positioned on a shoulder of a fire-fighter and secured to the fire-fighter's body, and a quick-release clamp mechanism which extends upwardly from the strap attachment assembly. The clamp mechanism of the clamp device includes a semi-cylindrically shaped lower hose support body and a semi-cylindrically shaped upper clamp shell which is pivotably attached to the lower hose support body. The upper clamp shell is pivotable upwardly and away from the lower hose support body to enable a fire hose to be placed on the concave upper surface of the lower hose support body, and pivotably downwardly to contact the upper surface of the hose. The clamp mechanism includes a cammed clasp lever which is pivotable downwardly onto the upper surface of the upper clamp shell, and securable in that position to cause a compressively clamping force to be exerted on the hose. The clasp lever is attached to a threaded screw member which is rotatable about its axis to adjust the closed spacing between the upper and lower clamp parts, thus enabling the clamp to compressively clamp hoses of various diameters. The clasp lever is pivotable upwardly and outwardly from the upper clamp shell, releasing clamping pressure and enabling the upper clamp shell to be pivoted upwardly and away from the lower hose support body, thus enabling a hose to be quickly released from the clamp mechanism.

DESCRIPTION OF THE PREFERRED EMBODIMENT

FIGS. 1-19 illustrate the construction and functions of a shoulder-mountable quick-release fire hose clamp according to the present invention.

Figure 1:
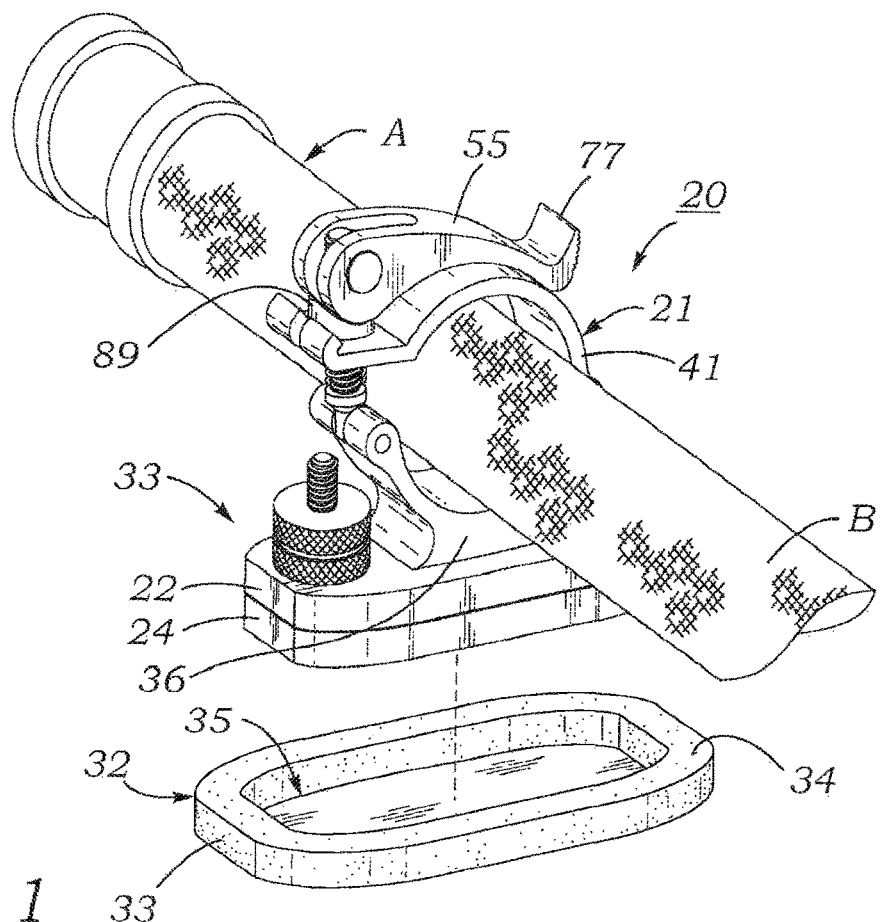
FIG. 1 is an exploded front perspective view of a shoulder-mountable quick-release fire hose clamp according to the present invention, showing a strap attachment assembly and fire hose clamp mechanism part of the clamp removed from a shoulder cushion part of the clamp.

As shown in FIG. 1, a fire hose clamp 20 according to the present invention includes a clamp mechanism 21 for releasably gripping the outer circumferential wall surface of a fire hose A, and a strap attachment assembly 33 for supporting the clamp mechanism and releasably attaching to a shoulder strap. Clamp mechanism 21 includes a flat, uniform thickness clamp mechanism base plate 22 which has a flat lower surface 23. As is described below, clamp mechanism base plate 22 is adjustably fastenable to a shoulder strap attachment base plate 24 of strap attachment assembly 33. Shoulder-strap attachment base plate 24 has the form of a flat uniform thickness plate which has a plan-view outline shape that is congruent with the plan-view outline shape of clamp mechanism base plate 22.

Figure 3:
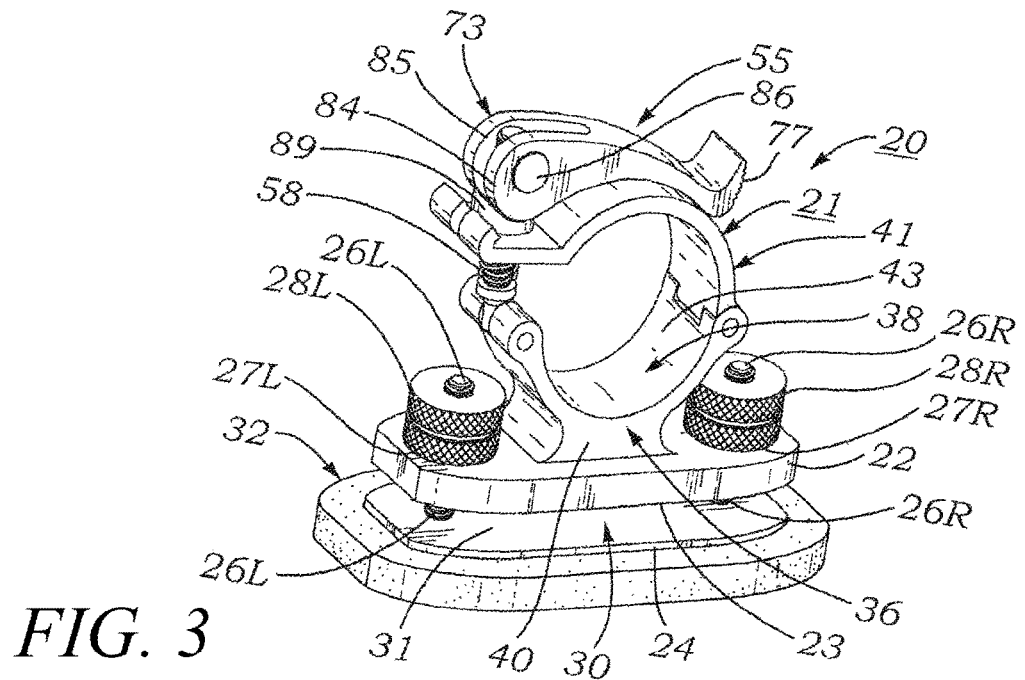
FIG. 3 is a perspective view showing a hose clamp mechanism base plate of the hose clamp mechanism loosened from a strap attachment base plate of the strap attachment assembly.

As may be seen best by referring to FIG. 3, shoulder-strap attachment base plate 24 has a pair of laterally spaced-apart, externally threaded fastener studs 26L, 26R that extend perpendicularly upwards from the upper surface 31 of the shoulder strap attachment base plate. As may be understood by referring to FIG. 3, clamp mechanism base plate 22 has disposed through its thickness dimension a pair of laterally spaced apart clearance holes 27L, 27R for insertably receiving the upper ends of threaded studs 26L, 26R.

Figure 4:
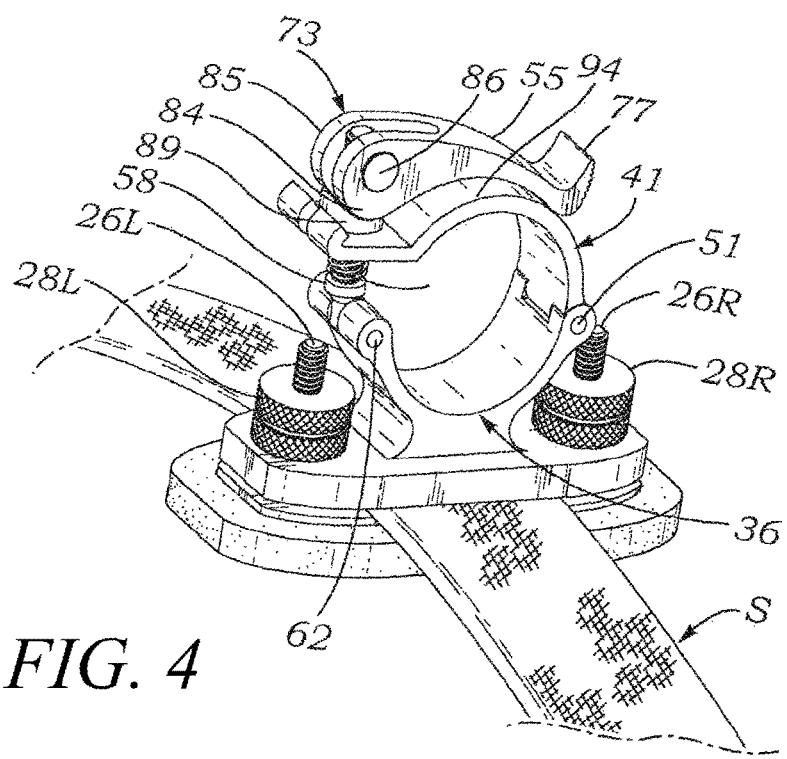
FIG. 4 is a perspective view showing a shoulder strap positioned between the upper surface of the shoulder strap attachment base plate and the lower surface of the clamp mechanism base plate, and the clamp mechanism base plate tightened down onto the shoulder strap attachment base plate to secure the clamp to the strap.

Referring to FIGS. 3 and 4, it may be seen that the upper ends of threaded shoulder strap attachment base plate studs 26L, 26R have removably attached thereto knurled fastener nuts 28L, 28R, respectively. As shown in FIGS. 3 and 4, this arrangement enables a shoulder-strap S to be inserted into a space 30 between the lower surface 23 of clamp mechanism base plate 22, and the upper surface 31 of shoulder strap attachment base plate 24. Then, as shown in FIG. 4, knurled fastener nuts 28L, 29R are threadably tightened on studs 26L, 26R to compressively clamp onto the shoulder-strap S, thus securely fastening hose support clamp 20 to the shoulder-strap.

Referring to FIGS. 1-4, it may be seen that fire hose support clamp 20 includes a shoulder cushion 32. Shoulder cushion 32 is made of a resiliently deformable material such as high-density polyurethane foam, and has a plan-view outline shape congruent with that of clamp mechanism base plate 22 and shoulder-strap attachment base plate 24.

As shown in FIG. 1, shoulder cushion 32 has generally the shape of a laterally elongated, uniform thickness oval block which has extending perpendicularly downwards into a flat upper surface 34 thereof a cavity 35 that has a uniform transverse cross-section, oval shape. Cavity 35 has a plan-view outline shape congruent with that of base plate 22 and shoulder-strap attachment base plate 24, but of slightly smaller size. The resilient deformability of shoulder cushion 33 enables it to receive resiliently within cavity 35 both clamp mechanism base plate 22 and shoulder-strap attachment base plate 24, and resiliently grip the outer peripheral surfaces of the two base plates, thus remaining releasably attached to the clamp.

Figure 2:
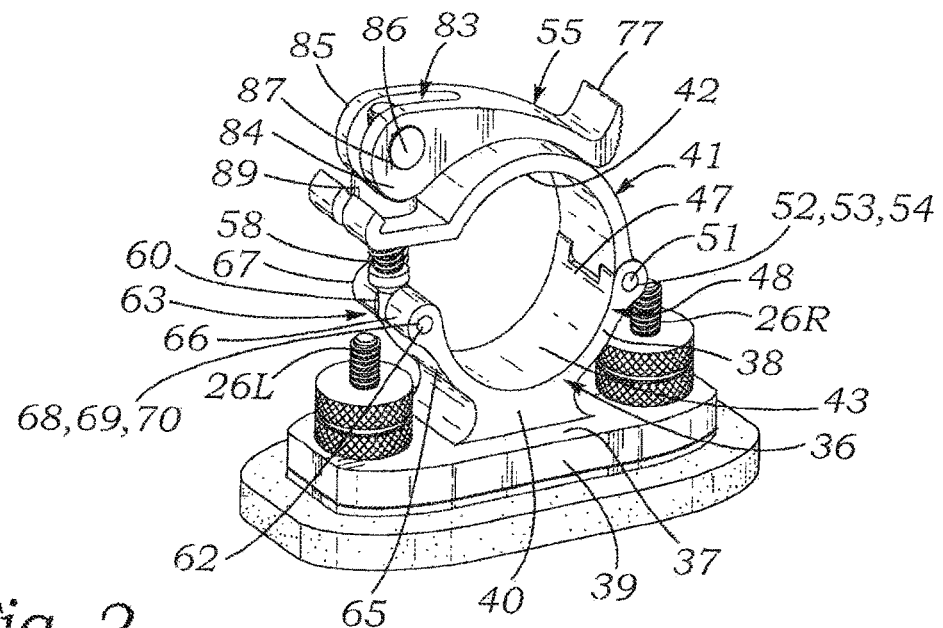
FIG. 2 is a perspective view of the fire hose clamp of FIG. 1, showing a shoulder strap attachment base plate of the strap attachment assembly fitted into the shoulder cushion.

Certain construction details and functions of clamp mechanism 21 of fire hose support clamp 20 may be best understood by referring to FIGS. 5-14, in addition to FIGS. 1 and 2. As shown in those figures, clamp mechanism 21 of fire hose support clamp 20 includes a generally semi-cylindrically shaped lower hose support body 36 that extends upwardly from the flat upper surface 37 of clamp mechanism base plate 22. The upper part of lower hose support body 36 has generally the shape of a thin, semi-cylindrically-shaped shell 38. Semi-cylindrical shell 38 has a longitudinal axis that is parallel to the upper surface 37 of clamp mechanism base plate 22, and perpendicular to front edge surface 39 of the clamp mechanism base plate. Semi-cylindrical shell 38 of lower hose support body 36 is supported by a short pedestal 40 which extends upwardly from the upper surface 37 of clamp mechanism base plate 22.

As shown in FIGS. 1-4, clamp mechanism 21 of fire hose support clamp 20 includes an upper clamp shell 41 which is pivotably attached to lower hose support body 36. Upper clamp shell 41 of clamp mechanism 21 has generally the shape of a thin, semi-cylindrical body. Upper clamp shell 41 has an upwardly concave semi-circular transverse cross-sectional lower surface 42 which has a shape that is complementary to that of the downwardly concave semi-cylindrical cross-section upper surface 43 of lower hose support body 36.

As may be seen best by referring to FIG. 2, upper clamp shell 41 has extending from a rear transverse edge 44 thereof a centrally located, rectangularly shaped tongue 45 that is received in a centrally located slot 46 formed in the upper end 47 of an upwardly extending right-hand arm 48 of lower hose support body 36. Slot 46 forms in the upper end 47 of upper right-hand arm 48 of lower hose support body 36, front and rear axially aligned boss sections 49 and 50, respectively. Upper clamp shell 41 is pivotably attached to lower hose support body 36 by a pivot pin 51 that extends through three axially aligned bores, namely, a front bore 52 which is disposed through front boss section 49 of right-hand arm 48 of lower hose support body 36, a middle bore 53 disposed through upper clamp shell tongue 45, and a lower bore 54 disposed through rear boss section 54 of right-hand arm 48.

Figure 5:
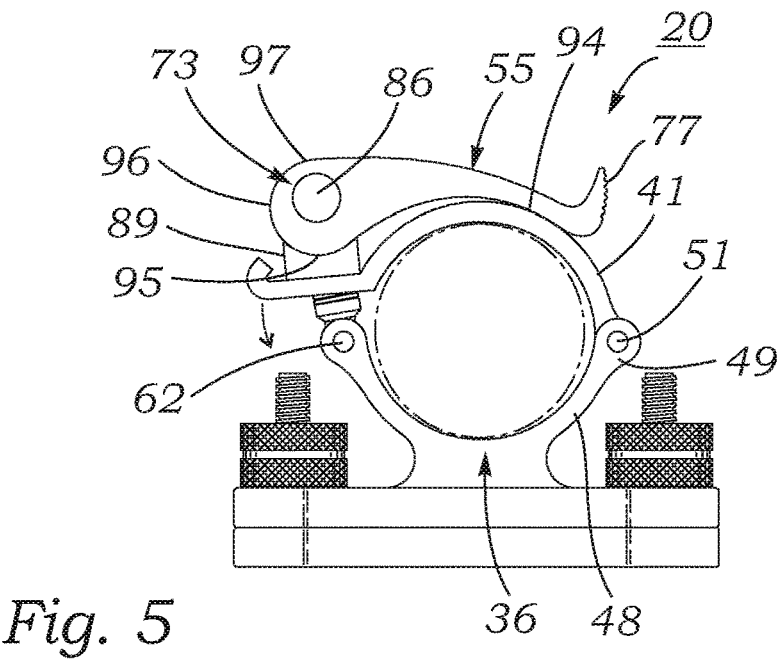
FIG. 5 is a front elevation view of the fire hose clamp of FIGS. 1-4.
Figure 7:
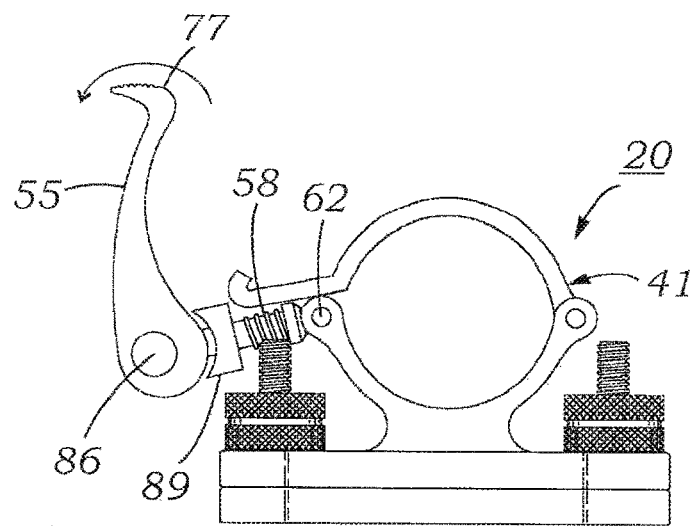
FIG. 7 is a front elevation view of the fire hose clamp of FIG. 5, showing the clasp lever support shaft of the clamp mechanism pivoted counterclockwise to disengage the clasp lever support shaft from the upper clamp shell component of the clamp.
Figure 8:
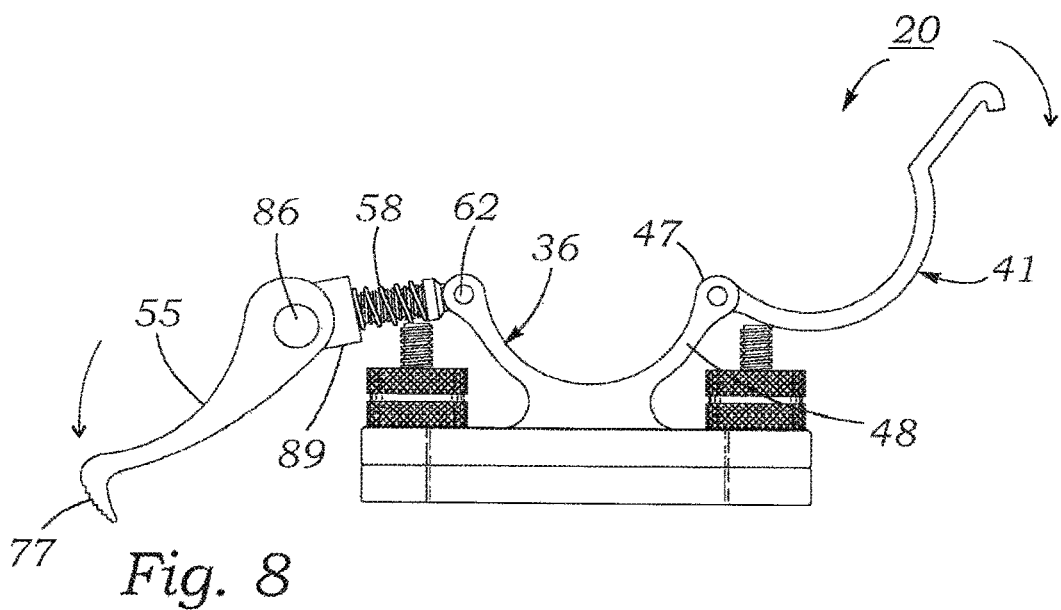
FIG. 8 is a front elevation view of the fire hose clamp of FIG. 6, showing the clasp lever pivoted further in a counterclockwise sense, and the upper clamp shell pivoted clockwise from a closed position overlying lower hose support body of the clamp to an open position for receiving a length of hose.
Figure 9:
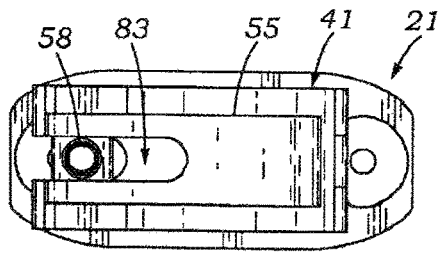
FIG. 9 is a top plan view of the fire hose clamp as shown in FIG. 5.

As may be understood by referring to FIGS. 5-11, pivot pin 51 enables upper clamp shell 41 of clamp mechanism 21 to be pivoted counterclockwise between an open position (FIGS. 8 and 11) to a closed, clamping position (FIGS. 5 and 9).

As shown in FIGS. 1-13, clamp mechanism 21 of fire hose clamp 20 includes a clasp lever 55 for securing upper clamp shell 41 to lower hose support body 36 at adjustable relative spacings therebetween to thereby compressively clamp onto the outer cylindrical surface of fire hoses of various diameters. As shown in FIGS. 1-13, upper clamp shell 41 has extending into a left side edge 56 thereof a centrally located, relatively long U-shaped slot 57. As will be described below, slot 57 is provided to receive an upper part of a support shaft 58 of clasp lever 55.

As shown in FIGS. 8-11. clasp lever support shaft 58 has generally the form of an externally threaded eye bolt which has at the lower end 59 thereof an eye 60. Eye 60 receives through a bore 61 disposed coaxially through the eye a clasp lever support shaft pivot pin 62.

Figure 11:
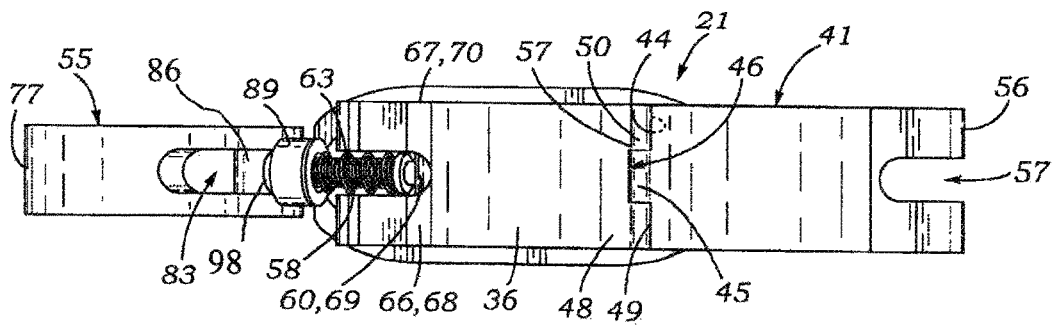
FIG. 11 is a top plan view of the fire hose clamp as shown in FIG. 8.

As may be seen best by referring to FIGS. 2 and 11, eye 60 of clasp lever support shaft 58 is positioned in a slot 63 that extends downward into the upper edge wall 64 of a left-hand lower support body arm 65. Slot 63 is located midway between the front and rear sides of left-hand saddle arm 65, and partitions the upper end of the left-hand lower support arm into front and rear axially aligned boss sections 66, 67. Eye 60 is pivotably supported between front and rear boss sections 66, 67 by clasp lever support shaft pivot pin 62. Clasp lever support shaft pivot pin 62 is disposed through three axially aligned bores, namely, a bore 68 through front boss 66, a bore 69 through eye 60, and bore 70, through rear boss 67.

Figure 12:
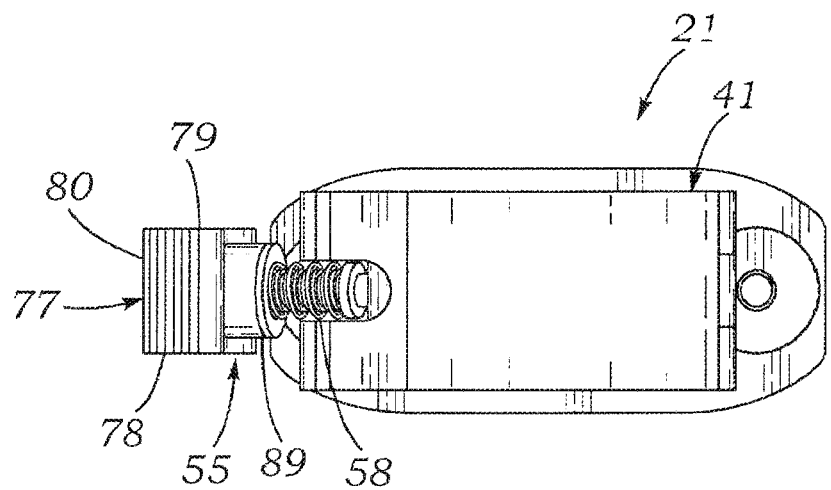
FIG. 12 is a top plan view of the fire hose clamp as shown in FIG. 7.
Figure 13:
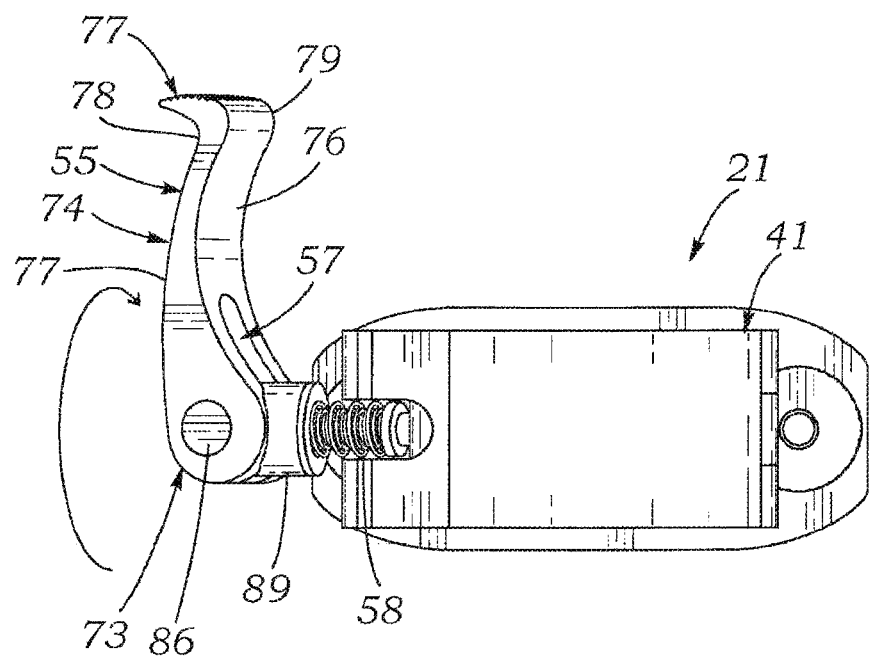
FIG. 13 is a top plan view similar to that of FIG. 12, but showing the clasp lever, and attached clasp lever clamp lever support shaft turned counterclockwise with respect to the threaded clasp lever support shaft to threadingly advance the clasp lever outwardly and thus increase the spacing between the upper clamp shell and the lower hose support body, as shown in FIG. 14.
Figure 14:
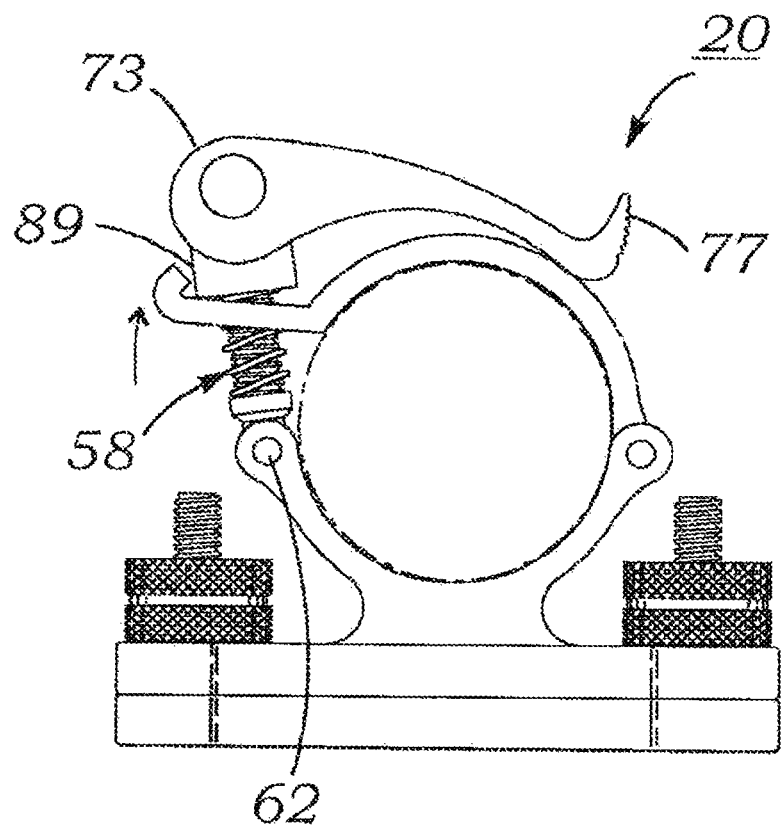
FIG. 14 is a front elevation view similar to that of FIG. 5, but showing the spacing between the upper hose clamp shell and the lower hose support body increased to accommodate a larger diameter fire hose.

As may be seen best by referring to FIGS. 2,12 and 13, clasp lever 55 of clamp mechanism 21 has generally the shape of an arcuately curved body which has flat, parallel front and rear sides 71, 72. As may be seen best by referring to FIGS. 2 and 5-8, clasp lever 55 has in front and rear elevation views a relatively thick, rounded left end cam section 73 which tapers inwardly towards a relatively thinner right-hand plate section 74. Plate section 74 has a convex upper wall surface 75, and a concave lower wall surface 76. As shown in FIGS. 12 and 13, the thinner right-hand plate section 74 of clasp lever 55 tapers inwardly to a thinner upturned finger grip end section 77. As shown in FIG. 12, finger grip end section 77 of clamp lever 55 has disposed between front and rear sides 78 and 79 of the clasp lever a series of parallel laterally disposed grooves 80 to facilitate grasping between a fire-fighter's fingers.

As shown in FIGS. 2 and 11, clasp lever 55 has extending inwardly into left side edge 81 thereof a centrally located relatively long U-shaped slot 83. Slot 83 forms in the left-hand side of clasp lever 55 front and rear shoulder sections 84, 85, respectively. As shown in FIGS. 2 and 9, transversely disposed clasp lever pivot pin 86 is rotatably held within a front bore 87 through front clasp lever shoulder section 84 and a rear bore 88 through rear clasp lever shoulder section 85.

Figure 10:
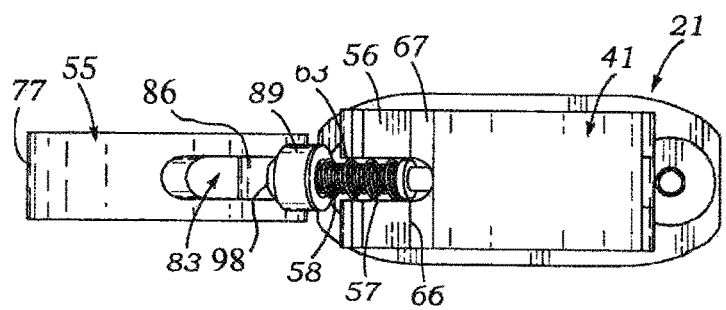
FIG. 10 is a top plan view of the fire hose clamp positioned similarly to FIG. 7, but with the clasp lever pivoted fully counterclockwise.

As shown in FIGS. 10 and 11, the upper end of externally threaded clasp lever support shaft 58 is threadingly received within an internally threaded bore 98 which extends radially through clasp lever pivot pin 86 shown in FIGS. 2, 3, 4, 7 and 8.

As may be seen best by referring to FIGS. 2 and 5-11, clamp mechanism 21 of fire hose clamp 20 includes a bushing 89 which has through its thickness dimension a bore that coaxially receives the upper end of clasp lever support shaft 58. Bushing 89 has formed in upper surface 90 thereof a transversely disposed U-shaped groove 91. Bushing 89 is urged into conformal contact with the lower arcuately curved bottom left-hand end section 92 of clasp lever 55 by a compression spring 93. As may be seen best by referring to FIGS. 7, 8, and 10, compression spring 93 is positioned coaxially over the threaded shank of clasp lever support shaft 58. The lower end of compression spring 93 bears against a flange located above eye 60, while the upper end of the spring bears against the lower surface of compression bushing 89.

The manner in which fire hose clamp 20 is used to grip a fire hose may be best understood by referring to FIGS. 1-13.

Figure 6:
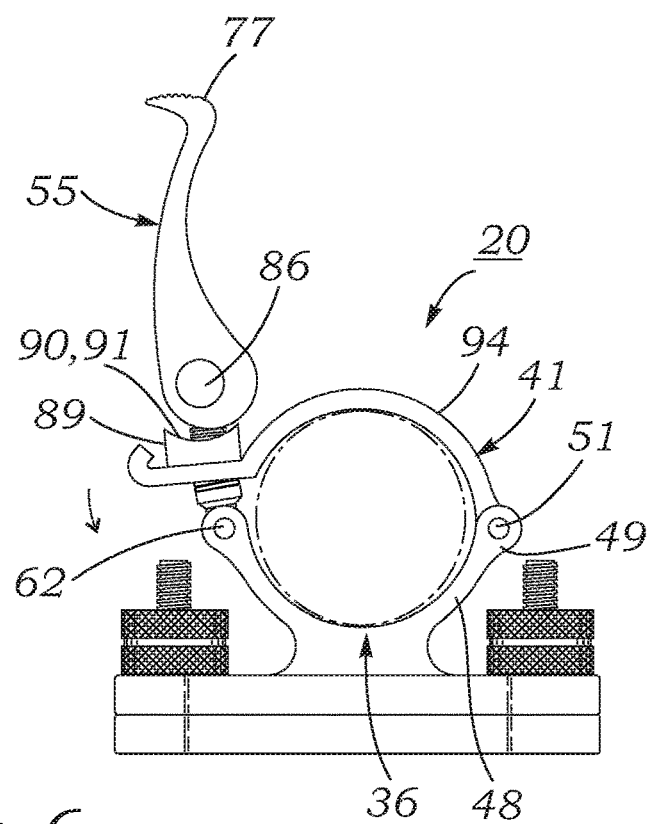
FIG. 6 is a view similar to FIG. 5, showing a clasp lever of the clamp mechanism part of the clamp pivoted counterclockwise to unlock an upper clamp shell component of the clamp mechanism.

Referring first to FIGS. 8 and 11, a fire hose such as fire hose A shown in FIG. 1 is placed on the upper surface 43 of lower hose support body 36 of clamp mechanism 21. Next, as may be understood by referring to FIGS. 7 and 11, upper clamp shell 41 is pivoted counterclockwise to overlie lower hose support body 36. In this position, slot 57 in upper clamp shell 41 overlies clasp lever support shaft 58. As shown in FIGS. 7 and 6, clasp lever 55 and clasp lever support shaft 58 are then pivoted clockwise about the axis of clasp lever support pivot pin 62, thus positioning the clasp lever support shaft vertically within slot 57 of upper clamp shell 41. Finally, as shown in FIG. 5, clasp lever 55 is pivoted clockwise on clasp lever pivot pin 86 into contact with the upper surface 94 of upper clamp shell 41. As shown in FIGS. 5 and 6, pivoting clasp lever 55 clockwise downwards from a leftward extending or vertical position to a rightward extending position results in the larger radius, lower cam surface 95 of front and rear shoulder sections 84, 85 of cam section 73 of clasp lever 55 to replace the smaller-radius front upper cam surfaces 96 and 97. This causes compression bushing 89 to be pressed down against the upper surface of upper clamp shell 41, thus urging the upper clamp shell into compressive contact with a hose A disposed between the upper clamp shell 41 and lower hose support body 36.

Figure 15:
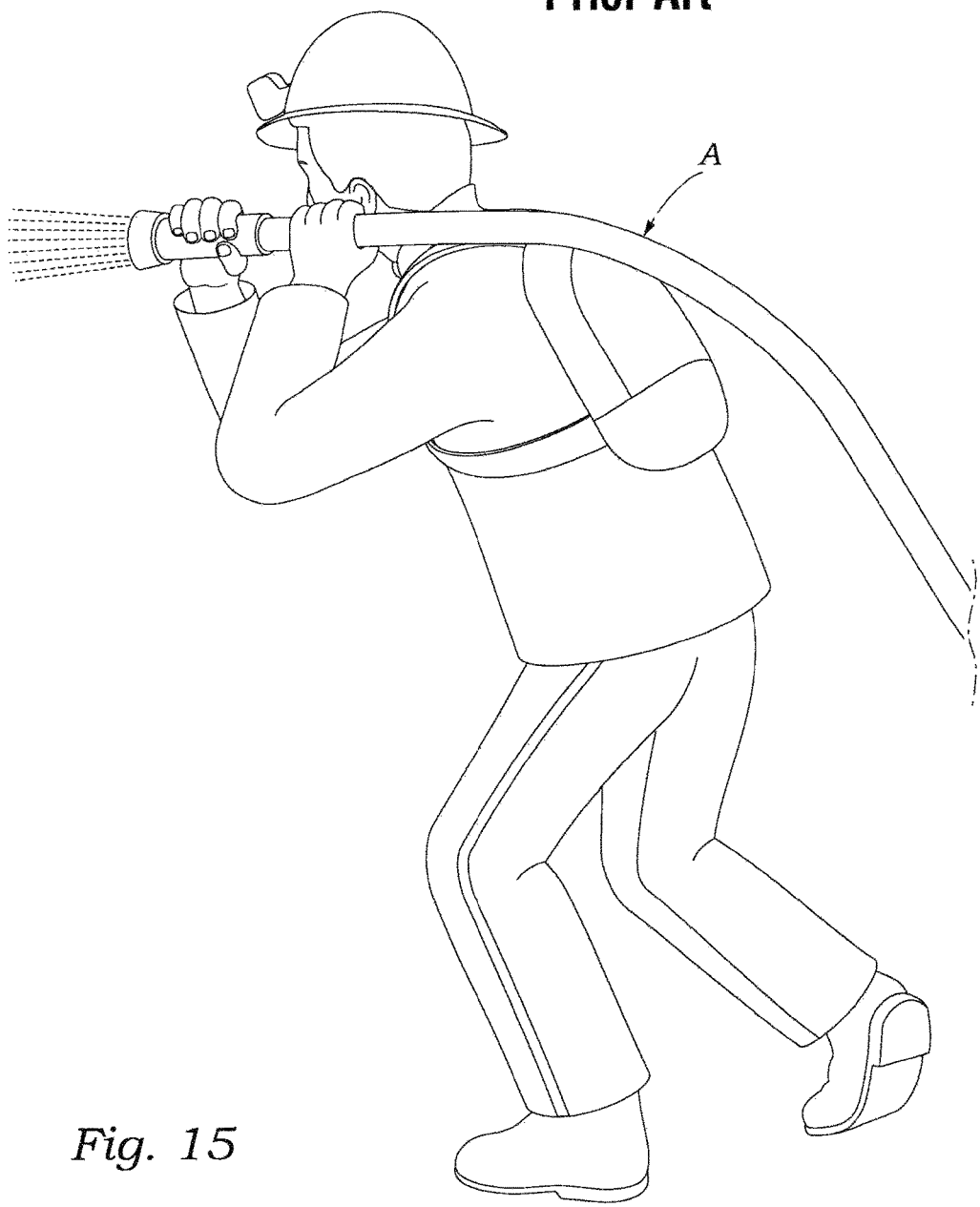
FIG. 15 is a perspective view showing a prior art method of supporting a fire hose.

FIG. 15 illustrates a prior art method of supporting a fire hose A positioned on a shoulder of a fire-fighter. Prior art methods consist essentially of resting a fire hose on a shoulder of a fire-fighter, and may include the use of flexible straps to help secure the hose in place on the shoulder.

Figure 16:
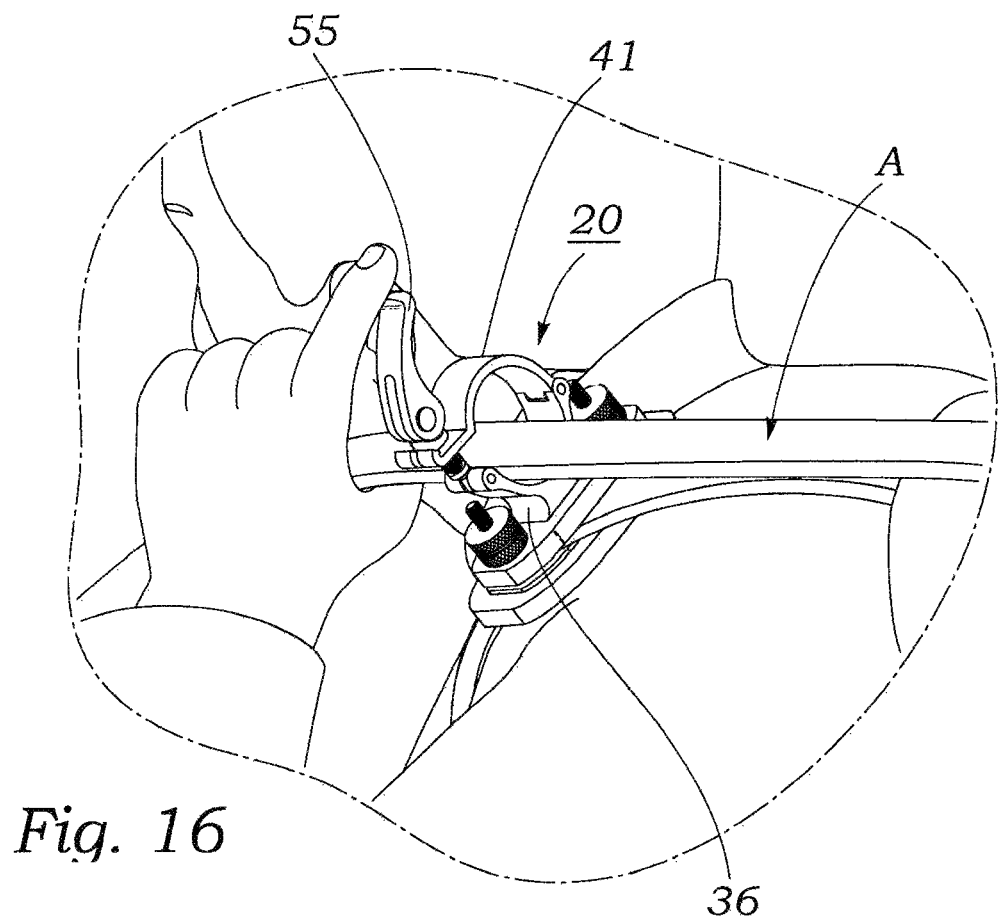
FIG. 16 is a perspective view showing the fire hose clamp of FIGS. 1-3 attached to the shoulder strap of a fire-fighter, and an unpressurized fire hose deployed through the opening between the upper clamp shell and the lower hose support body.
Figure 17:
FIG. 17 is a perspective view showing an unpressurized fire hose held in the fire hose clam of FIGS. 1-3 and 16 being dragged by a fire-fighter.
Figure 18:
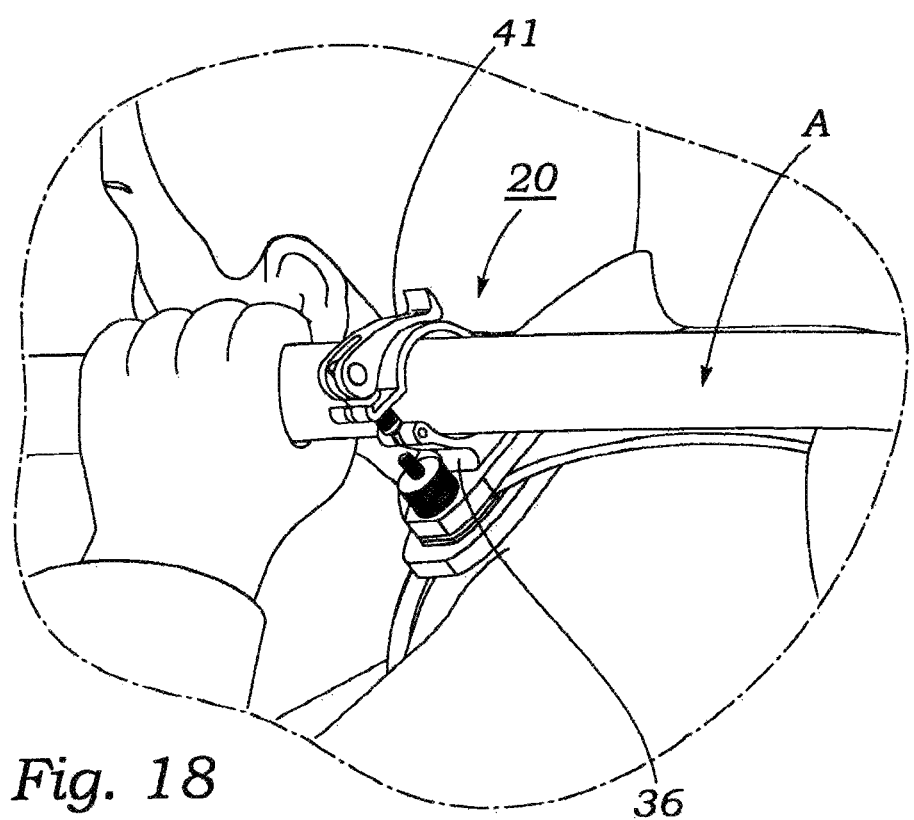
FIG. 18 is a perspective view similar to FIG. 16, but showing the fire hose pressurized with a fire-suppressing fluid such as water or foam and the clamp secured to the hose.

FIGS. 16-19 show how the fire hose clamp 20 according to the invention is used. As shown in FIG. 16, a fire hose A is placed on the lower hose support body 36 of clamp 29 and the upper hose clamp shell 41 pivoted into a closed position over the hose. The clasp lever 55 is then pivoted down to a locking position on the upper surface of upper clamp shell 41 as shown in FIG. 18.

Figure 19:
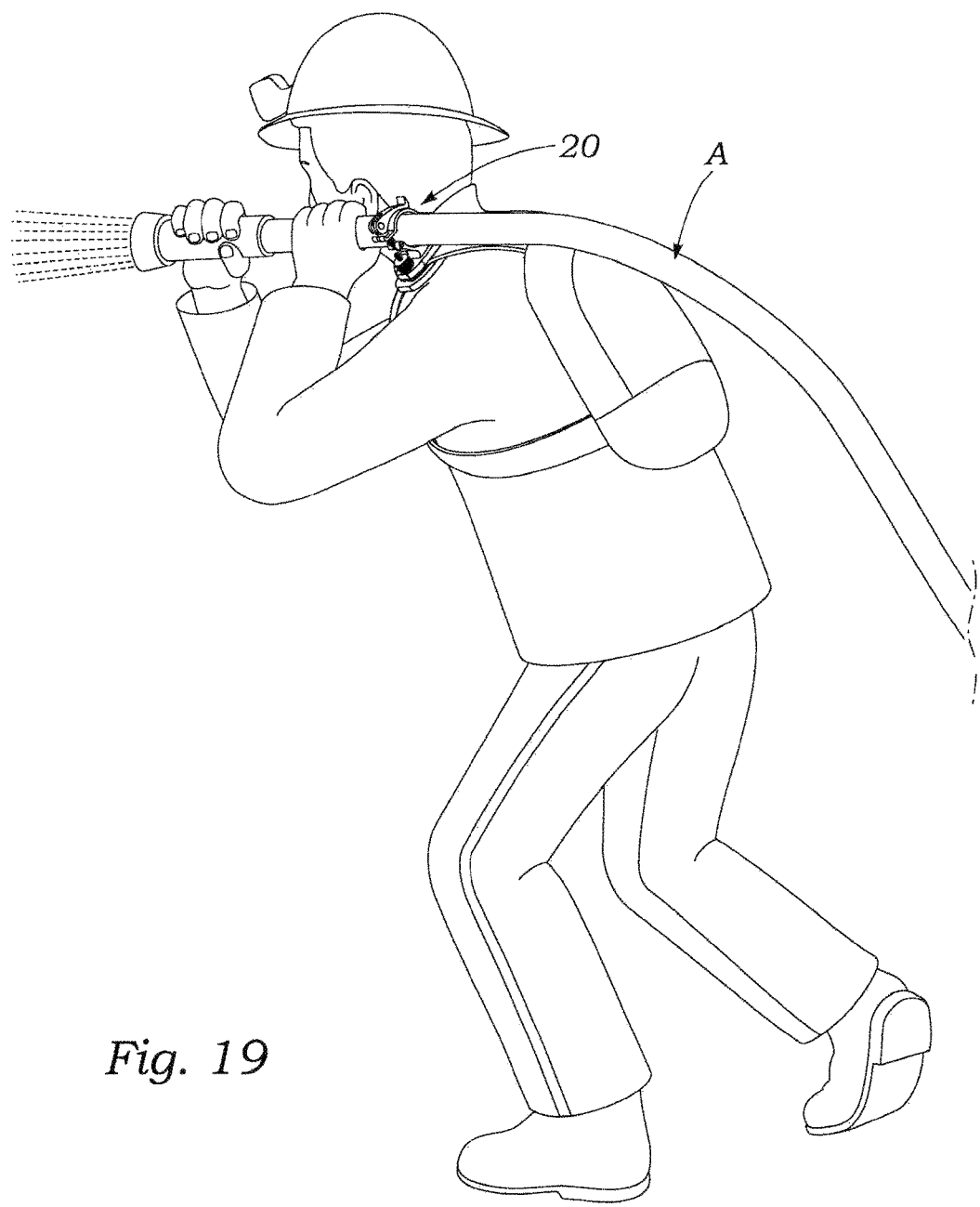
FIG. 19 is a perspective view of the fire hose clamp and fire hose of FIG. 18.

As shown in FIG. 17, clamp 20 is effective in maintaining an empty fire hose A in place on a shoulder of a fire-fighter. And, as shown in FIG. 19, clamp 20 is effective in maintaining a fire hose A that is pressurized with water or foam in place on the shoulder of a fire-fighter, thus freeing the fire-fighter's hands for use in bracing the hose and orient the nozzle to direct a stream of water issued from the nozzle in a desired direction.

It is not uncommon for the path of a wildfire to change abruptly because of changes in wind direction and velocity. In such cases, if is imperative for a fire-fighter to be able to disengage a fire hose clamped to his shoulder strap so that he may safely flee an approaching blaze. The fire hose clamp 20 according to the present invention affords a capability of quickly releasing a fire hose held in the clamp. Thus as may be understood by referring to FIGS. 5-8, a fire hose held by clamp 20 may be quickly released by a fire-fighter by grabbing the finger-grip end 77 of clasp lever 55 and pivoting it counterclockwise to an unclasped position as shown in FIG. 8, allowing upper hose clamp shell 41 to pivot away from lower clamp support body 36 and allowing immediate release of a fire hose which had been clamped between the upper clamp shell 41 and lower hose support body 36.

What is claimed is:

1. A clamp for securing a fire hose in place on a fire-fighter's shoulder, comprising:
  a clamp mechanism for releasably gripping
  a fire hose, wherein the clamp mechanism includes,
  a clamp base plate,
  a lower hose support body having a left and a right side which extends upwardly from the clamp base plate,
  an upper clamp shell having an upper clamp shell pivot side pivotably attached to the lower hose support body right side, the upper clamp shell having generally the shape of a semi-cylindrical body which has an arcuately curved, upwardly concave lower surface, whereby pivoting the upper clamp shell downwards from an open position to a closed position overlying the lower hose support body forms between confronting concave surfaces of the upper clamp shell and the lower hose support body an arcuately curved, cylindrically shaped space for receiving a fire hose, the upper clamp shell left side having a notch,
  a support shaft having a support shaft upper end, and
  a support shaft lower end, the support shaft lower end being pivotably attached to the lower hose support body left side,
  a clasp lever, the clasp lever being pivotably fastened to and threadingly attached to the support shaft upper end,
  the support shaft being pivoted to move the support shaft upper end into the upper clamp shell notch and to position the clasp lever above the slot, the clasp lever being turned to threadingly tighten or loosen the spacing between the upper clamp shell and the lower hose support body,
  a bushing having a bore though its thickness dimension that coaxially receives the upper end of clasp lever support shaft, the bushing being urged into conformal contact with a lower arcuately curved bottom left-hand end section of the clasp leaver, a strap attachment assembly for supporting the clamp mechanism and releasably attaching the clamp mechanism to a fire-fighter's shoulder.

2. The clamp of claim 1 wherein the strap attachment assembly includes a shoulder strap base plate for releasably securing the shoulder strap base plate to a shoulder strap.

3. The clamp of claim 2 wherein the strap attachment assembly includes a fastener mechanism for releasably securing the shoulder strap base plate to the clamp base plate.

4. The clamp of claim 3 wherein the fastener mechanism for securing the shoulder strap base plate to the clamp mechanism base plate includes at least one fastener device effective in exerting a compressive force on a strap disposed between confronting surfaces of the clamp base plate and the shoulder strap base plate.

5. The clamp of claim 4 wherein the fastener device includes a laterally spaced-apart pair of threaded studs which protrude from a first one of the confronting surfaces towards a second one of the confronting surfaces, a pair of laterally spaced-apart bores through a second one of the confronting surfaces, the bores being alignable with the studs, and a pair of threaded nuts tightenable on shanks of the threaded studs when the studs are inserted through the bores.

6. The clamp of claim 1 wherein the clasp lever from an unlocked position extending outwardly from the upper clamp shell and the lower hose support body to an inwardly extending locked position overlying the upper clamp shell, the clasp lever having a cammed lower surface that exerts a compressive force on the upper clamp shell when the clasp lever is pivoted to the locked position.

7. The clamp mechanism of claim 2 further comprising:
a compression spring, the compression spring being positioned coaxially over the threaded shank of the clasp lever support shaft and having an outside diameter that makes it interference free of the notch, a lower end of the compression spring being positioned to bear against a flange located above of the clasp lever support shaft eye as the upper end of the compression spring bears against the lower surface of compression bushing.

8. A clamp for securing a fire hose in place on a fire-fighter's shoulder, comprising:
a clamp mechanism for releasably gripping a fire hose, wherein the clamp mechanism includes, a clamp base plate,
a lower hose support body which extends upwardly to a left and a right end,
an upper clamp shell having an upper clamp shell pivot side pivotably attached to the lower hose support body right end,
the lower hose support body having a centrally positioned slot on its left end, with a front and rear boss on each side of the notch, a coaxially aligned bore passing thorough the front and rear bores,
a support shaft having a support shaft upper end, and a support shaft lower end, the support shaft lower end having a eye bore,
a pin passes through the front and rear bores of the left end of the lower hose support body with the support shaft lower end eye bore between the front and rear bores, the pin providing a pivot axis for the support shaft eye bore,
a clasp lever, the clasp lever being pivotably fastened to and threadingly attached to the support shaft upper end,
the upper clamp shell having a centrally positioned notch on its left end,
the support shaft being pivoted on the pin to position the support shaft upper end into the upper clamp shell notch above the support shaft eye bore, the clasp lever being above the upper clamp shell notch,
the clasp lever having a lower arcuately curved bottom left-hand camed end section with a U-shaped slot, a clasp lever pivot pin passing through the U-shaped slot, the clasp lever pivot pin having a threaded bore that receives a complementary threaded support shaft upper end, the clasp lever being turned to threadingly tighten or loosen the spacing between the upper clamp shell and the lower hose support body, and
a strap attachment assembly for supporting the clamp mechanism and releasably attaching the clamp mechanism to a fire-fighter's shoulder.

9. The clamp mechanism of claim 8 further comprising: a bushing having a bore though its thickness dimension bore that coaxially receives the upper end of clasp lever support shaft, the bushing being urged into conformal contact with a lower arcuately curved bottom left-hand camed end section of the clasp leaver to rotate with the support shaft.

10. The clamp mechanism of claim 9 further comprising:
a compression spring being positioned coaxially over the threaded shank of the clasp lever support shaft interference free of the notch, a lower end of the compression spring bearing against a flange located above of the clasp lever support shaft eye, as the upper end of the compression spring bears against the lower surface of compression bushing.

11. A clamp for securing a fire hose in place on a fire-fighter's shoulder, comprising:
a clamp mechanism for releasably gripping a fire hose, wherein the clamp mechanism includes, a clamp base plate,
a lower hose support body which extends upwardly from the clamp base plate, and
an upper clamp shell having an upper clamp shell pivot side pivotably attached to the lower hose support body, and
an upper clamp shell opposing side having a notch,
a support shaft having a support shaft upper end, and
a support shaft lower end, the support shaft lower end being pivotably attached to the lower hose support body,
a clasp lever, the clasp lever being pivotably fastened to and threadingly attached to the support shaft upper end,
the support shaft being pivoted to move the support shaft upper end into the upper clamp shell notch to position the clasp lever above the slot, the clasp lever having a clasp lever pivot pin with a threaded bore to receive a support shaft complementary threaded upper end, the clasp lever being turned to threadingly tighten or loosen the spacing between the upper clamp shell and the lower hose support body, and
a strap attachment assembly for supporting the clamp mechanism and releasably attaching the clamp mechanism to a fire-fighter's shoulder.

12. The clamp of claim 11 wherein the strap attachment assembly includes a shoulder strap base plate for releasably securing the shoulder strap base plate to a shoulder strap.

13. The clamp of claim 12 wherein the strap attachment assembly includes a fastener mechanism for releasably securing the shoulder strap base plate to the clamp base plate.

14. The clamp of claim 13 wherein the fastener mechanism for securing the shoulder strap base plate to the clamp mechanism base plate includes at least one fastener device effective in exerting a compressive force on a strap disposed between confronting surfaces of the clamp base plate and the shoulder strap base plate.

15. The clamp of claim 13 wherein the fastener device includes a laterally spaced-apart pair of threaded studs which protrude from a first one of the confronting surfaces towards a second one of the confronting surfaces, a pair of laterally spaced-apart bores through a second one of the confronting surfaces, the bores being alignable with the studs, and a nuts tightenable on shanks of the threaded studs when the studs are inserted through the bores.

16. The clamp mechanism of claim 12 further comprising:
   a bushing having a bore though its thickness dimension, the bore coaxially receives the upper end of clasp lever support shaft.

17. The clamp mechanism of claim 16 further comprising:
   a compression spring, the compression spring being positioned coaxially over the threaded shank of the clasp lever support shaft and being interference free of the notch, a lower end of the compression spring bears against a flange located above of the clasp lever support shaft eye, while the upper end of the compression spring bears against the lower surface of the compression bushing.

* * * * *